(12) United States Patent
Kaufmann et al.

(10) Patent No.: US 7,744,337 B2
(45) Date of Patent: Jun. 29, 2010

(54) TRANSPORT DEVICE, IN PARTICULAR FOR PANEL-TYPE WORKPIECES

(75) Inventors: Hubert Anton Kaufmann, Mellau (AT); Peter Weingartner, Dolsach (AT)

(73) Assignee: Durst Phototechnik Digital Technology GmbH (AT)

(*) Notice: Subject to any disclaimer, the term of this patent is extended or adjusted under 35 U.S.C. 154(b) by 614 days.

(21) Appl. No.: 10/543,531

(22) PCT Filed: Jan. 27, 2004

(86) PCT No.: PCT/AT2004/000028

§ 371 (c)(1),
(2), (4) Date: Aug. 1, 2006

(87) PCT Pub. No.: WO2004/067423

PCT Pub. Date: Aug. 12, 2004

(65) Prior Publication Data

US 2006/0291989 A1    Dec. 28, 2006

(30) Foreign Application Priority Data

Jan. 27, 2003    (AT)    .................... A 106/2003

(51) Int. Cl.
*B65H 3/00*    (2006.01)

(52) U.S. Cl. .................. 414/796.9; 414/795.4; 414/19; 414/797; 414/416.05; 414/933; 198/592; 198/632

(58) Field of Classification Search ............... 198/313, 198/632, 538, 581, 592, 861.1, 861.3, 369.3, 198/861.2, 860.5, 861.5; 414/790.2, 793–793.7, 414/794.4, 794.8, 758, 762, 564, 796.5, 796.8, 414/798.2, 798.6, 796.9, 19; 193/35 F, 35 TE; 14/71.3, 52, 58, 66; 271/267, 279, 3.18, 271/3.19, 3.23, 14; 212/314

See application file for complete search history.

(56) References Cited

U.S. PATENT DOCUMENTS

| 3,312,463 | A | * | 4/1967  | Van Hoose et al. ........ 271/10.14 |
| 3,780,884 | A | * | 12/1973 | Jones ........................ 414/793 |
| 3,837,140 | A | * | 9/1974  | Golantsev et al. ............. 53/540 |
| 3,876,060 | A | * | 4/1975  | Stease ........................ 198/632 |
| 4,220,239 | A | * | 9/1980  | Prichard, Jr. ................ 198/403 |
| 4,247,093 | A | * | 1/1981  | Kistner et al. .............. 271/3.24 |
| 4,753,564 | A |   | 6/1988  | Pearce et al. |
| 4,792,121 | A | * | 12/1988 | Annas et al. .................. 254/95 |
| 5,568,857 | A | * | 10/1996 | Chen et al. .................. 198/592 |
| 6,341,698 | B1| * | 1/2002  | Wursthorn ................... 209/552 |

FOREIGN PATENT DOCUMENTS

| DE | 1 263 610 | 3/1968 |
| DE | 1 263 610 B | 3/1968 |
| DE | 3427365 A1 * | 1/1986 |
| JP | 591 49 210 | 8/1984 |
| JP | 101 77 09 | 1/1989 |
| JP | 804 84 06 | 2/1996 |
| JP | 102 03 643 | 8/1998 |
| JP | 2000 159 232 | 6/2000 |

* cited by examiner

OTHER PUBLICATIONS

International Search Report.

*Primary Examiner*—Gregory W Adams
(74) *Attorney, Agent, or Firm*—Lerner, David, Littenberg, Krumholz & Mentlik, LLP

(57) ABSTRACT

The invention relates to a conveyor unit constituting a separating and feed mechanism (33), in particular for sheet-shaped workpieces, in particular sheets (3) to be printed, with a lifting mechanism (2) for transporting the sheet (3) vertically and a conveyor track with conveyor means (51, 52) for transporting the sheet (3) horizontally. This being the case, the conveying means (51, 52) are displaceable in a guide system between an operating position for feeding the sheet (3) to a production unit (36), in particular a printing machine (37), and a non-operating position to enable the sheet (3) to be lifted unhindered from a sheet stack (39).

36 Claims, 16 Drawing Sheets

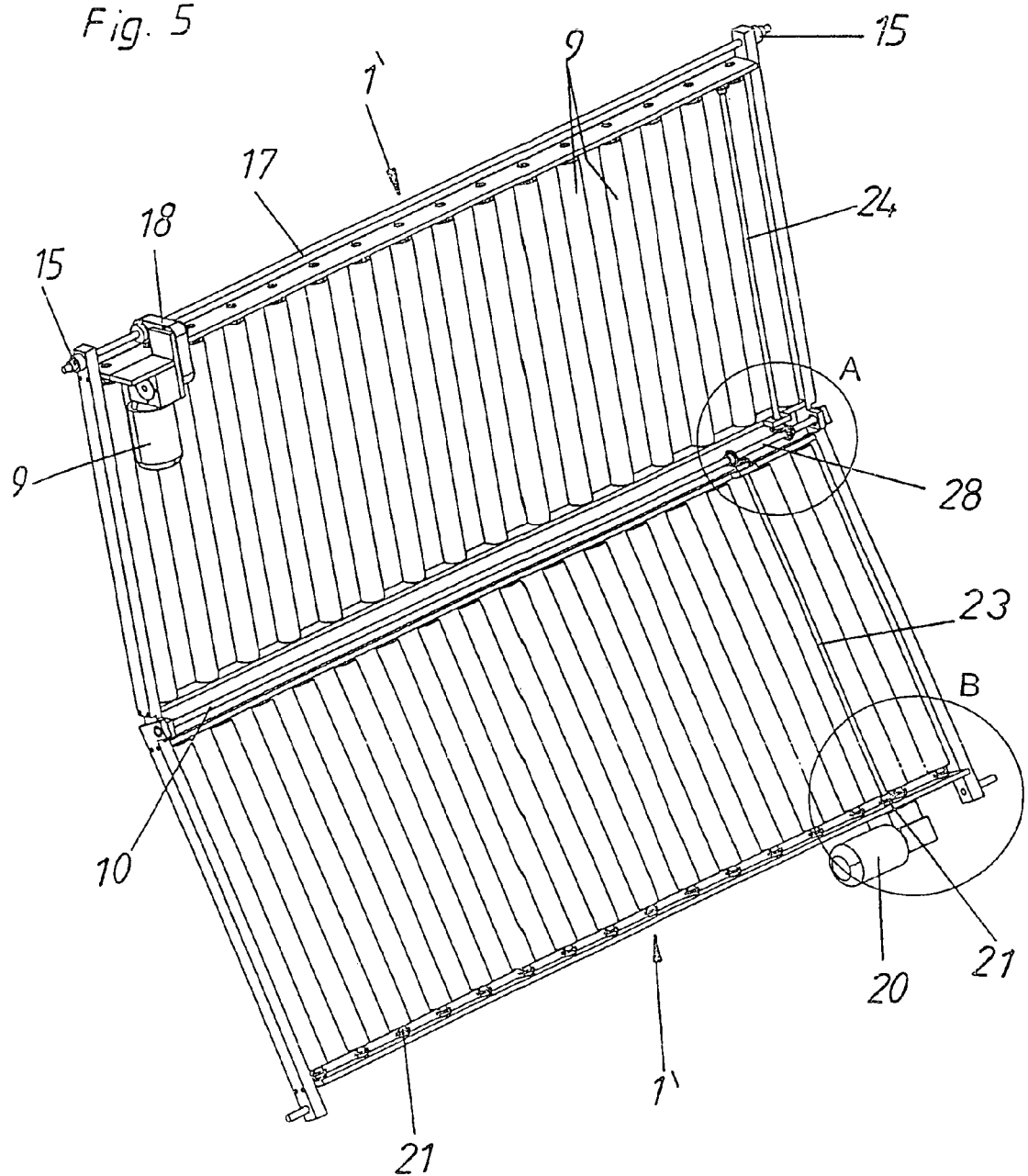

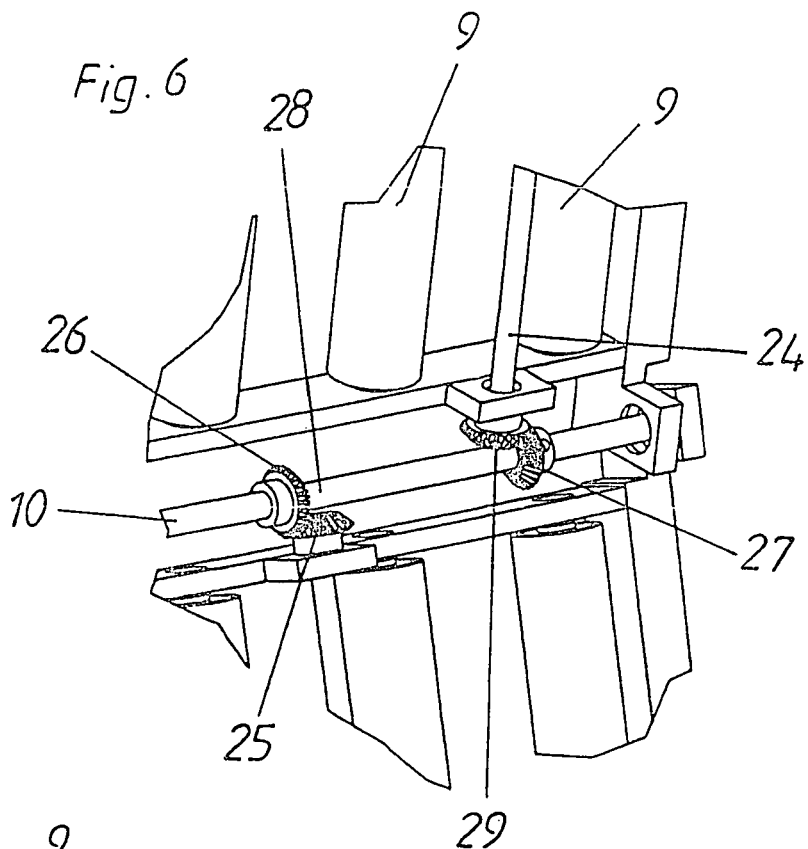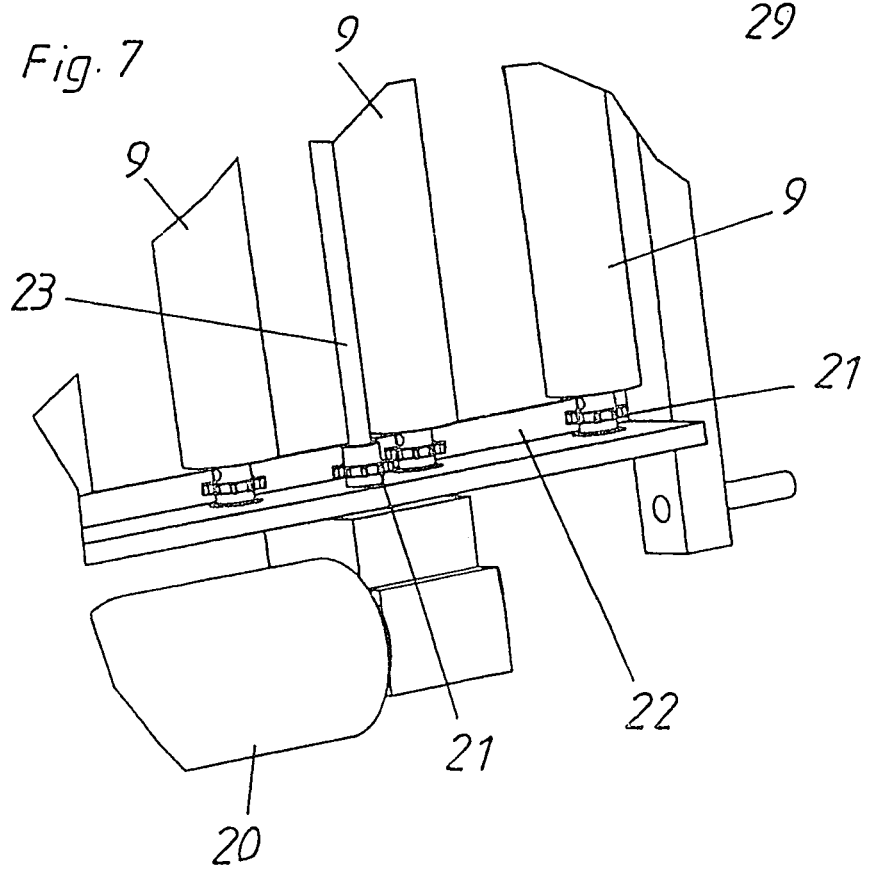

Figure 1:
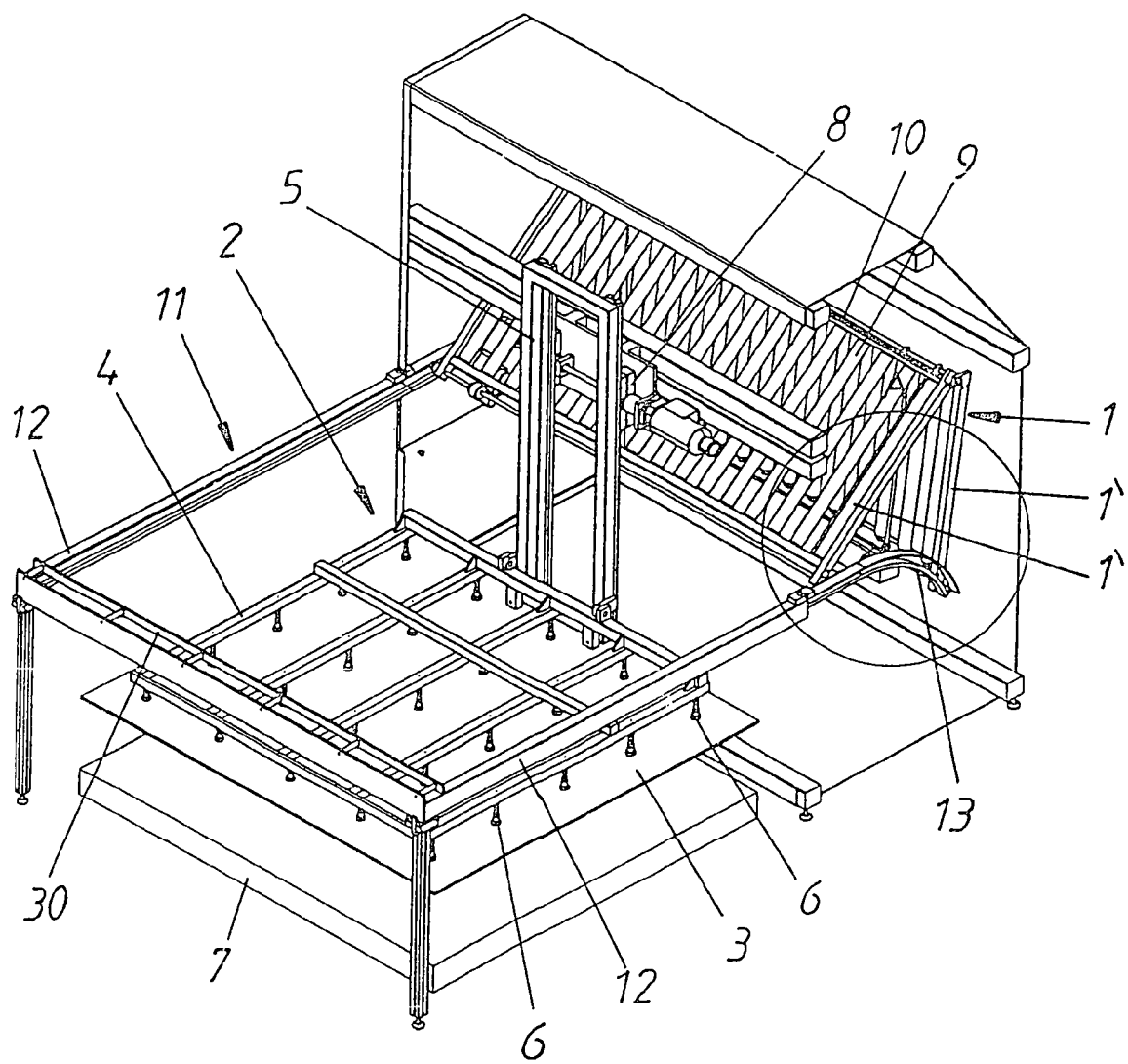

Fig. 9
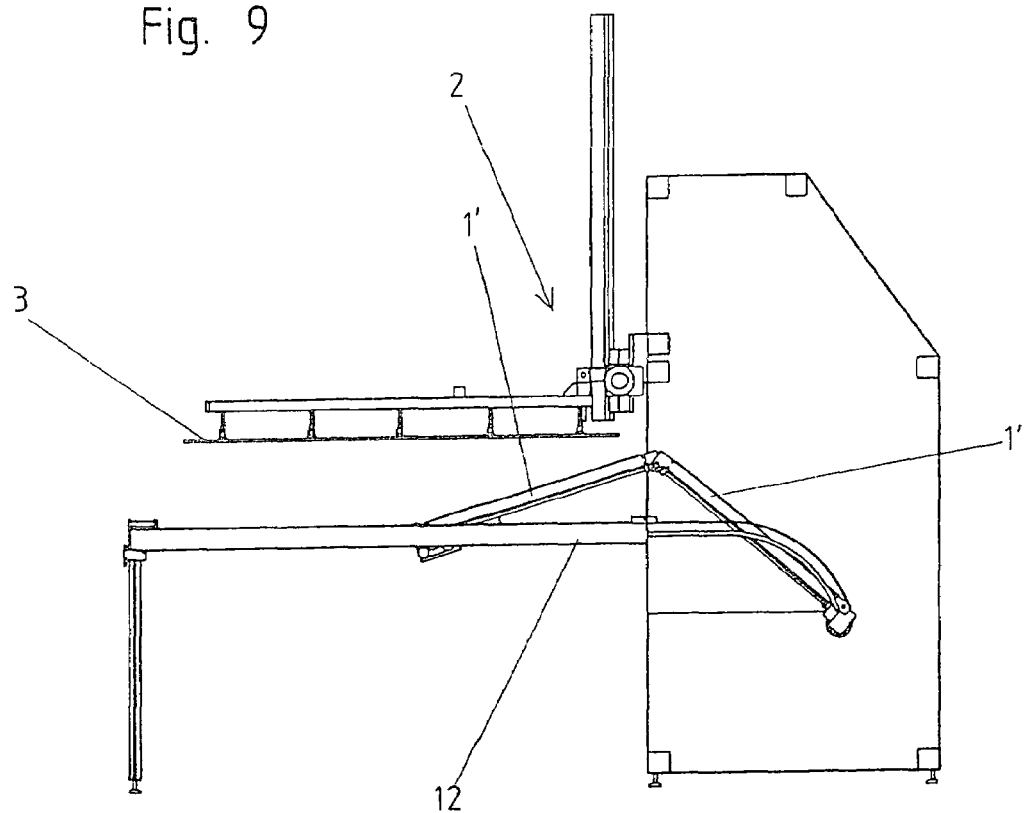
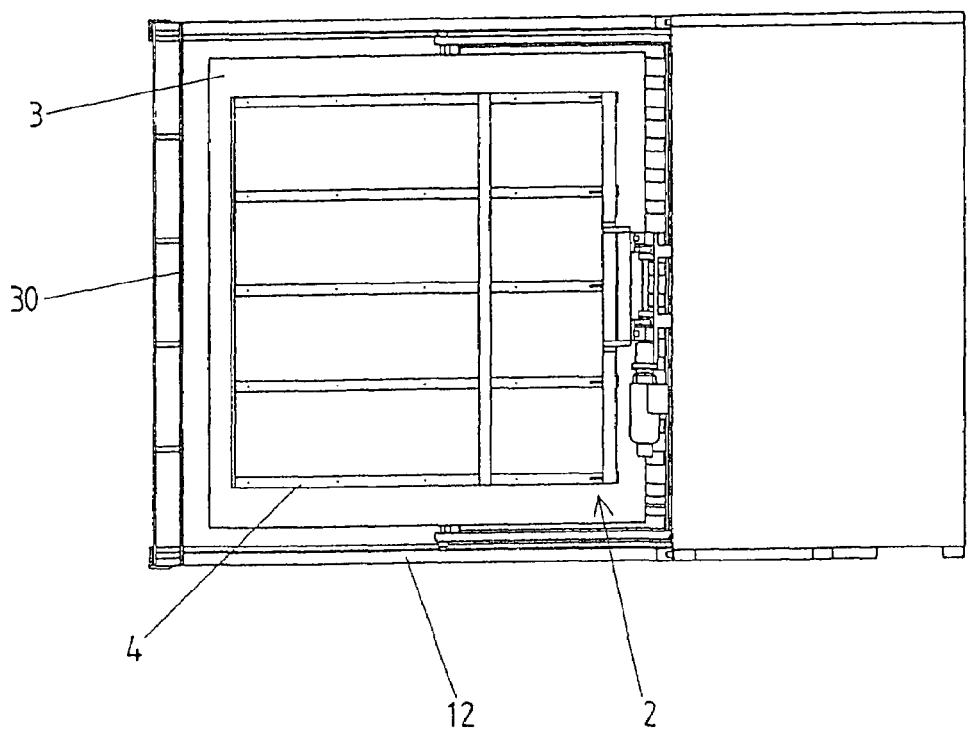
Fig. 10

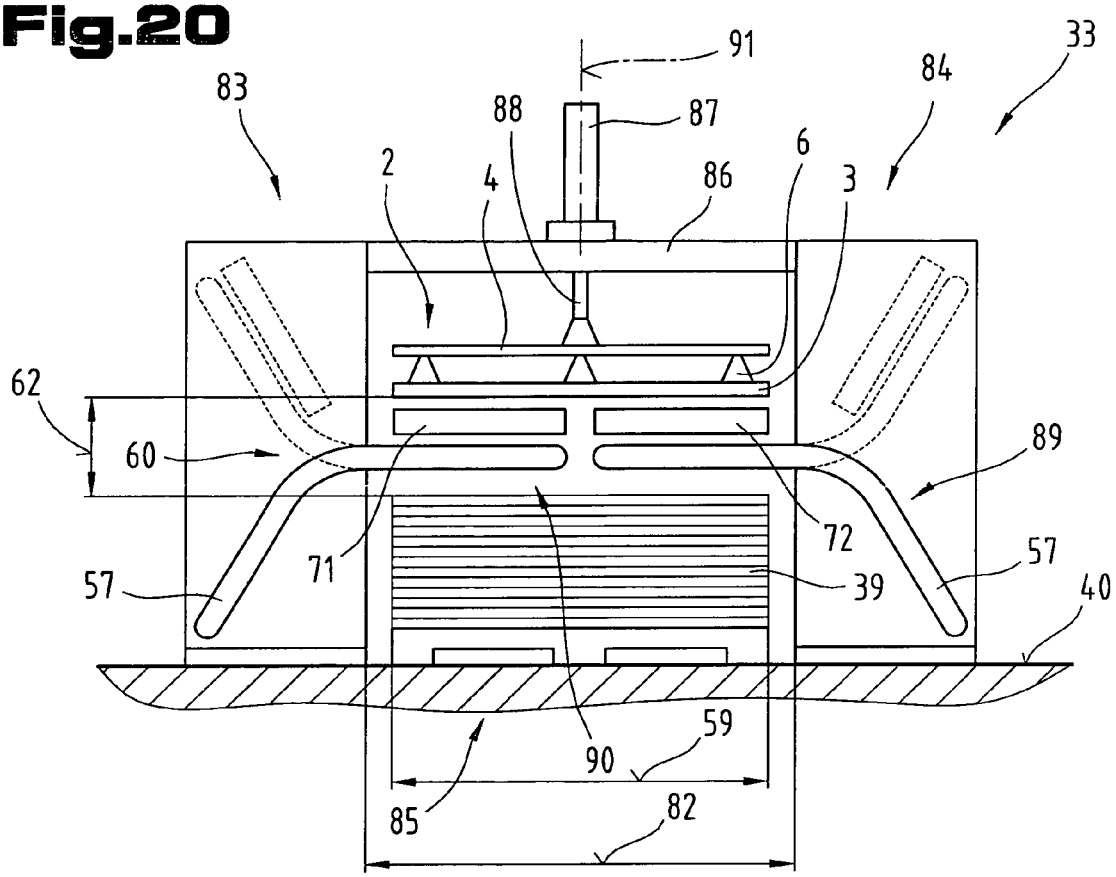
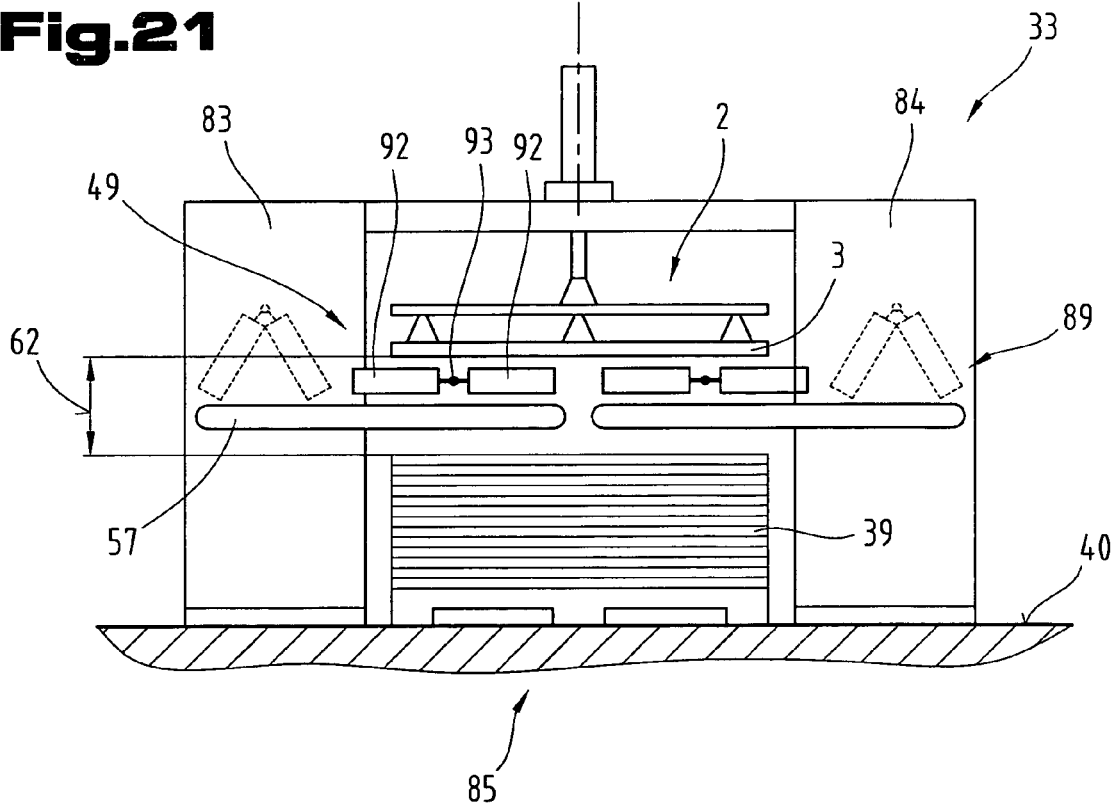

TRANSPORT DEVICE, IN PARTICULAR FOR PANEL-TYPE WORKPIECES

CROSS REFERENCE TO RELATED APPLICATIONS

Applicants claim priority under 35 U.S.C. §119 of AUSTRIAN Application No. A 106/2003 filed on Jan. 27, 2003. Applicants also claim priority under 35 U.S.C. §365 of PCT/AT2004/000028 filed on Jan. 27, 2004. The international application under PCT article 21(2) was not published in English.

The invention relates to a conveyor unit, in particular for sheet-shaped workpieces, of the type described in the introductory parts of claims 1 and 19.

With a conveyor unit of this type, the workpieces, for example sheets, can be lifted off a stack and delivered to a processing point.

The objective of the invention is to propose a device of this type which saves on space.

This objective is achieved by the invention on the basis of a conveyor mechanism which can be displaced between a non-operating position outside a lifting range of the sheet and a working position between the lifted sheet and the sheet stack, in order to keep the conveyor path free for the lifting mechanism.

The conveyor track of the conveyor unit advantageously consists of two part-tracks which can be tilted or pivoted about a common axis. This being the case, in order to fold the conveyor track, the first part-track can advantageously moved by its lateral edge positioned remotely from the second part track, whilst lifting the common axis, in the direction towards the lateral edge of the second part-track positioned remotely from the first part track.

The conveyor track may advantageously be designed so that it not only folds together but can also be moved transversely to the conveyor direction when in its extended position and can preferably be so across a distance of at least 100 mm. This advantageously provides a simple means of enabling a workpiece placed on the conveyor track to be oriented on a stop disposed transversely to the conveying direction of the conveyor track.

The device proposed by the invention also enables sheets that are very thin and/or have a large surface area made from paper, wood, plastic or a stone material, for example, to be lifted from a pallet stack and delivered to a processing station, for example a printing unit.

It is also of advantage if the conveyor mechanism has two conveyor means extending parallel in the conveying direction because this makes for a space-saving layout of the conveyor mechanism when it is moved out of the lifting range of the sheet when in the non-operating position.

One possible option is to provide the conveyor means in the form of at least one belt conveyor or band conveyor since this provides a tight, deformation-free support for the sheet.

The fact that each of the conveyor means has a drive saves on drive coupling elements.

In one embodiment whereby the conveyor mechanism can be displaced in a guide system extending perpendicular to the conveying direction, access to the production unit for carrying out any maintenance work is facilitated.

However, the conveyor mechanism can also be displaced in a guide system extending parallel with the conveying direction, thereby providing a linear transport path for the sheet.

In one embodiment in which the guide system is provided in the form of guide tracks disposed in the machine frame and extending parallel to form planes extending perpendicular to the conveying direction or planes extending parallel with the conveying direction, the conveyor mechanism can be displaced exactly and without becoming misaligned.

It is also of advantage if a support surface for the sheet formed by the conveyor means can be displaced into a more or less vertical position, as a result of which the total space requirement for the separating and feed mechanism is kept small.

The fact that the guide tracks are of a straight design makes for a simple structural design.

By using curved, arcuate or telescopic-type guide rails, a design is achieved which can be adapted to suit the requirements placed on a separating and feed mechanism of this type.

A displaceable mounting of the conveyor means in the guide rails by means of roller drives ensures a light displacement action and thus reduces driving power.

By providing a displacement drive for displacing the conveyor means between the operating position and the non-operating position, with a pressure cylinder which can be pressurised by a pressurising medium or an electric motor drive, automated processing can be set up with simple means.

A displacement drive in the form of a linear drive, e.g. a chain drive, spindle drive, pressure cylinder, enables the use of technically proven and inexpensive drives.

A design of the conveyor means split in the direction running perpendicular to or running parallel with the conveying direction guarantees a very compact parking system for the conveyor means in the non-operating position.

A pivotable connection of the conveyor means in a pivot system in a dividing plane saves on displacement drives.

If at least one conveyor means is provided with a stop means forming a restrictor stop for a workpiece edge in a direction extending parallel with the conveying direction, this provides a particularly simple way of orienting the workpiece along the workpiece edge by displacing the conveyor means in order to feed it into the production unit in exactly the right position.

A particularly simple design is achieved by using a guide rail as the stop means.

However, another option is to provide at least one positioning device on a frame of the lifting mechanism and/or the conveyor means for orienting the workpiece on the stop means, because this enables the workpiece to be oriented independently of the displacement of the conveyor means.

Finally, it is also of advantage if the positioning device is provided in the form of at least one driven conveyor cylinder or conveyor roller, resulting in a technically simple and economical design.

Figure 2:
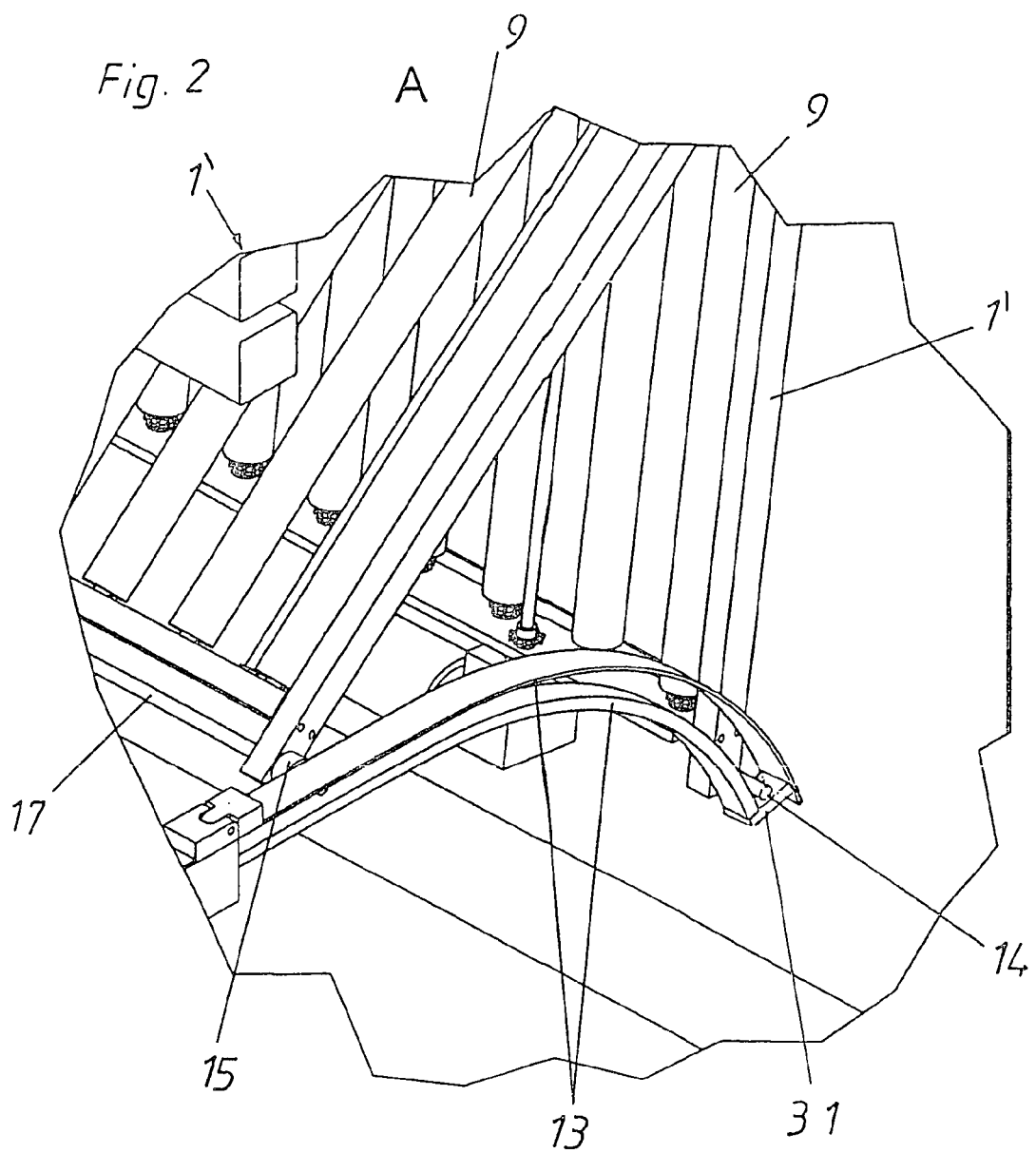
Figure 3:
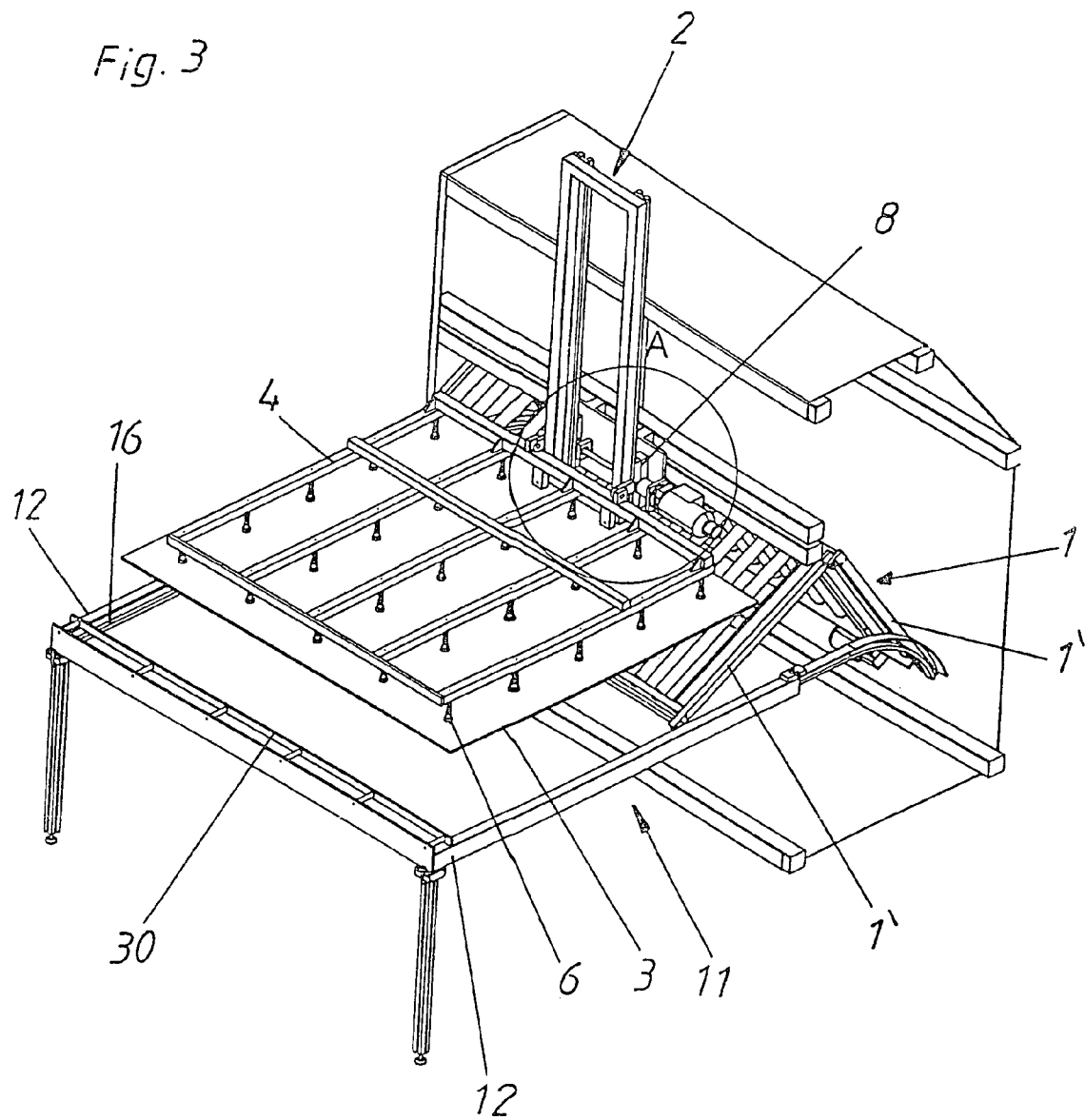
Figure 4:
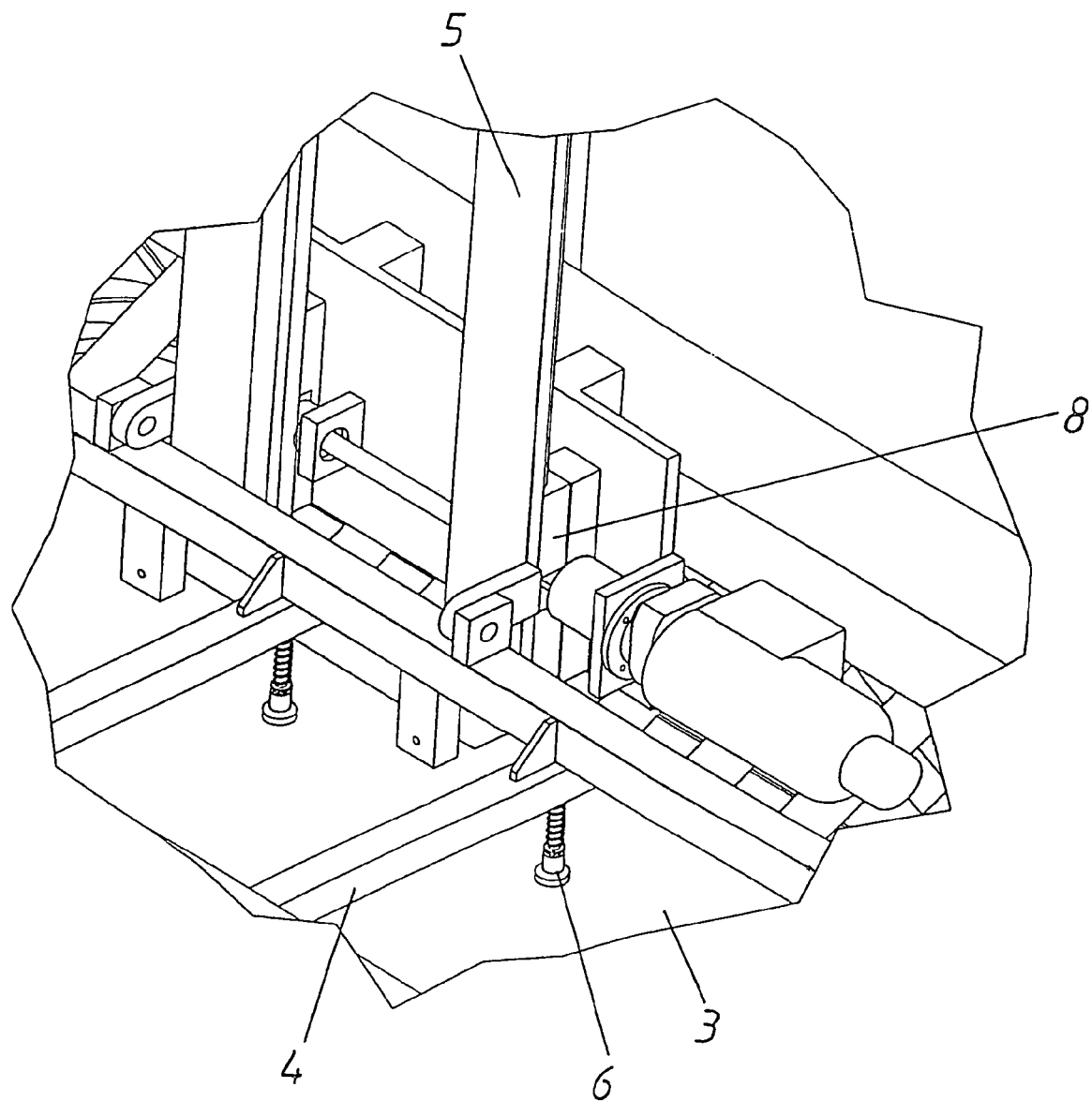
Figure 8:
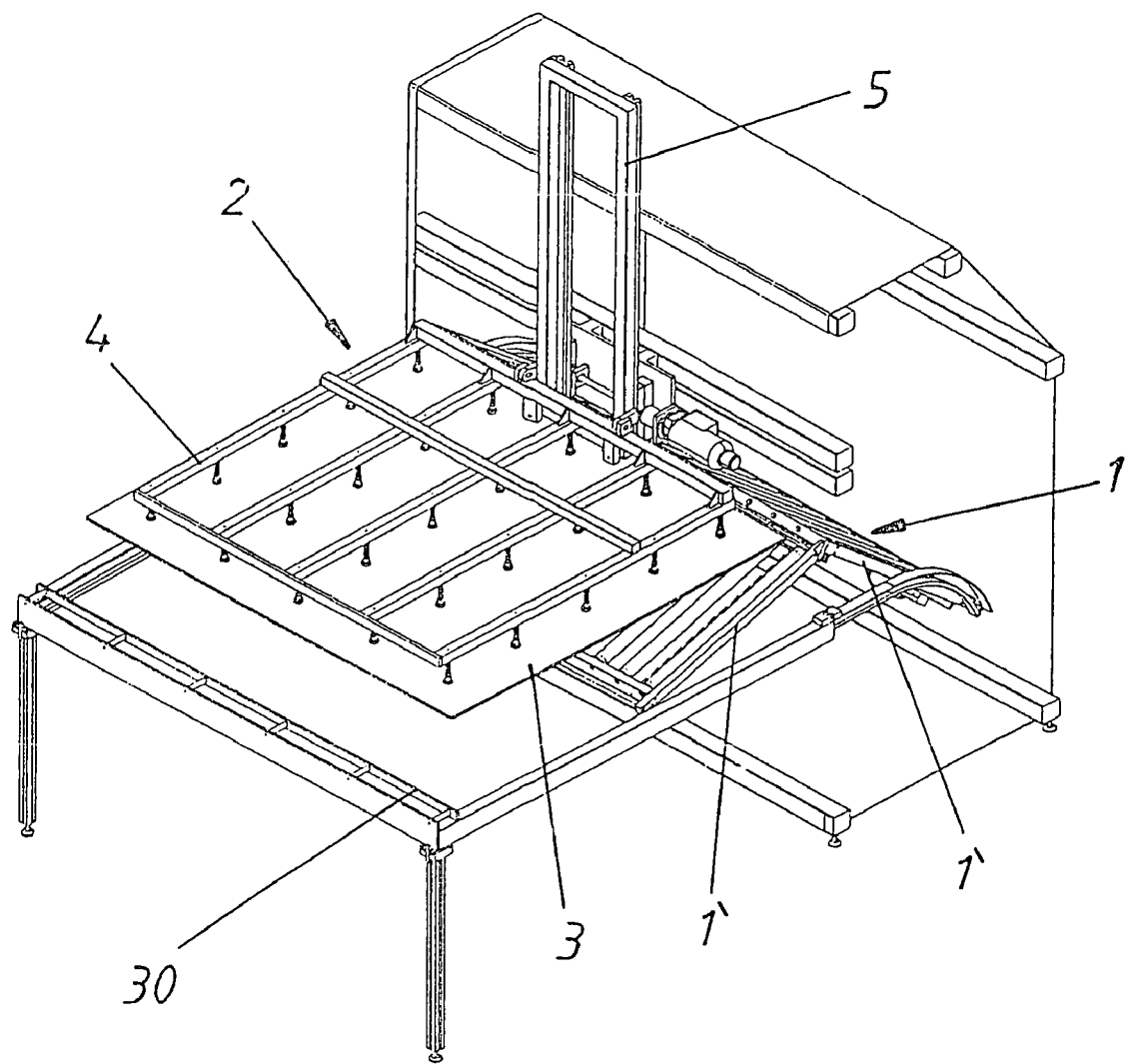
Figure 11:
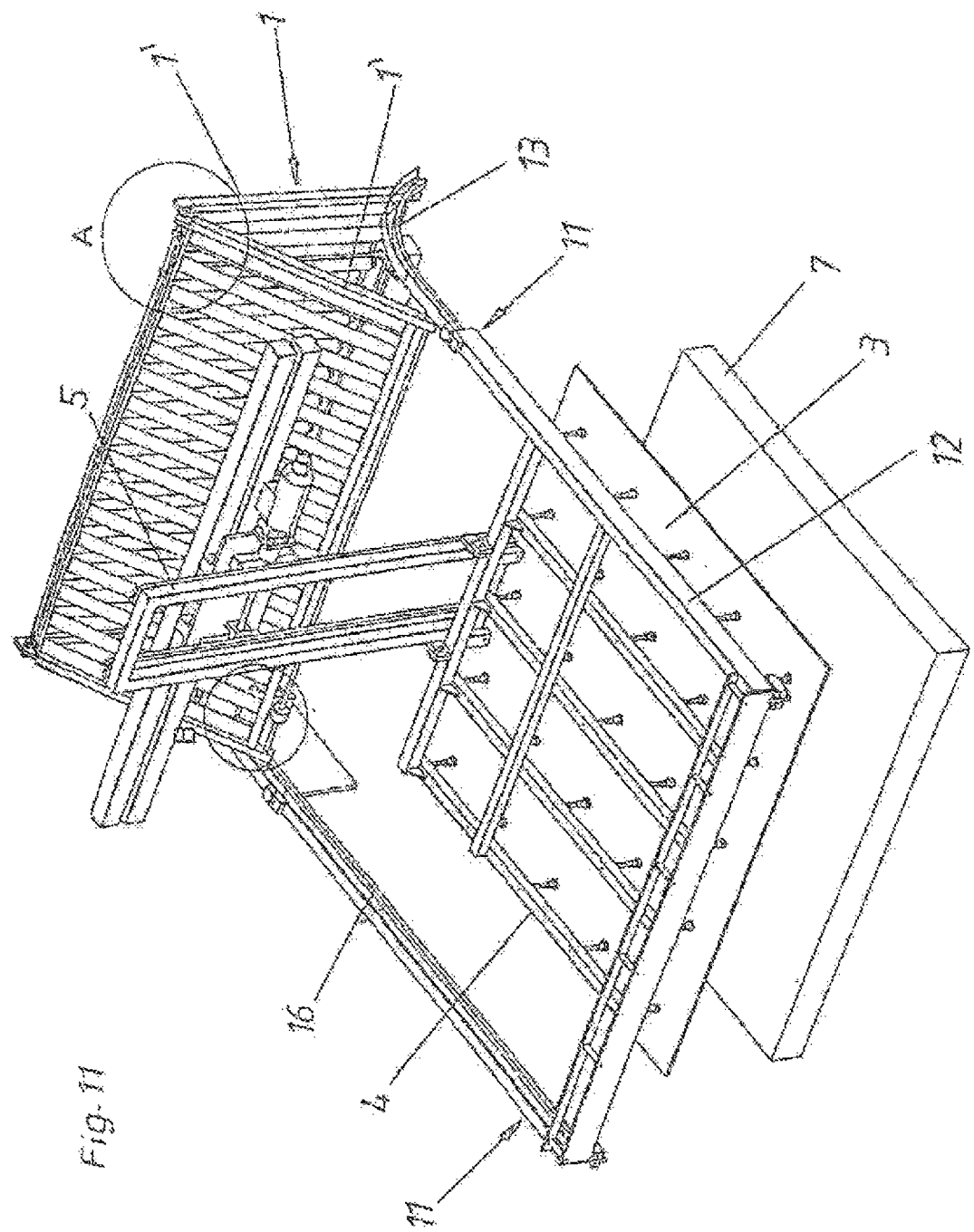
Figure 12:
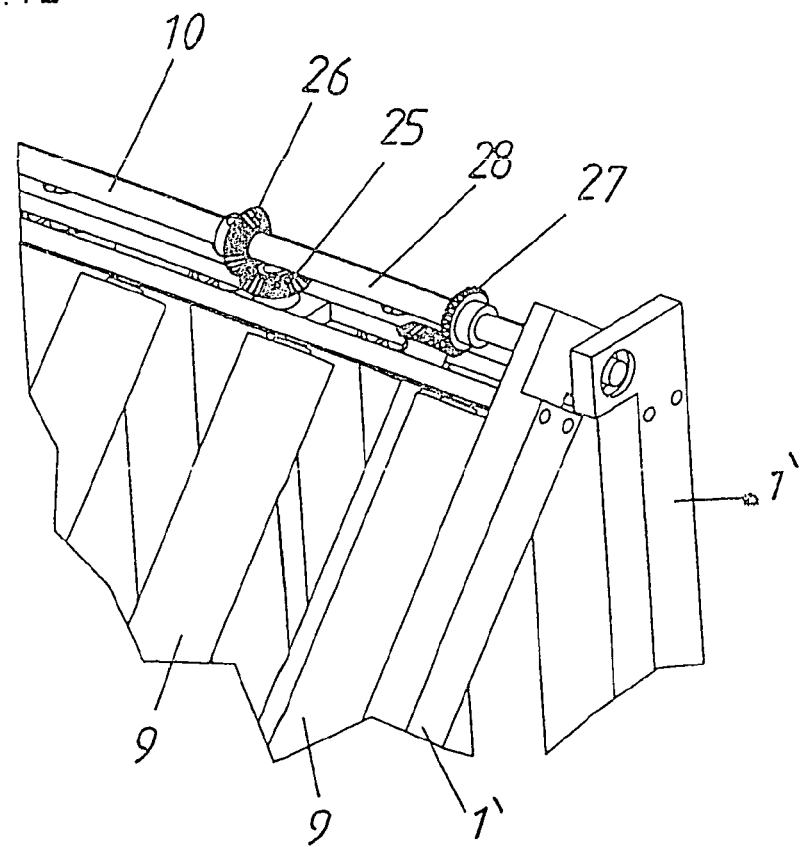
Figure 13:
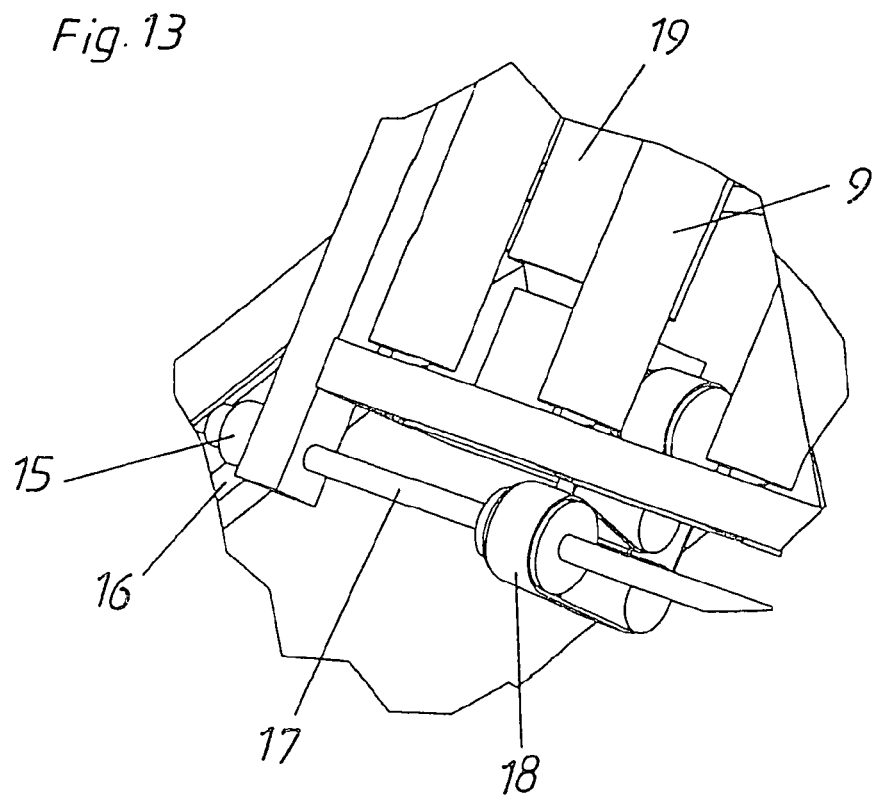
Figure 14:
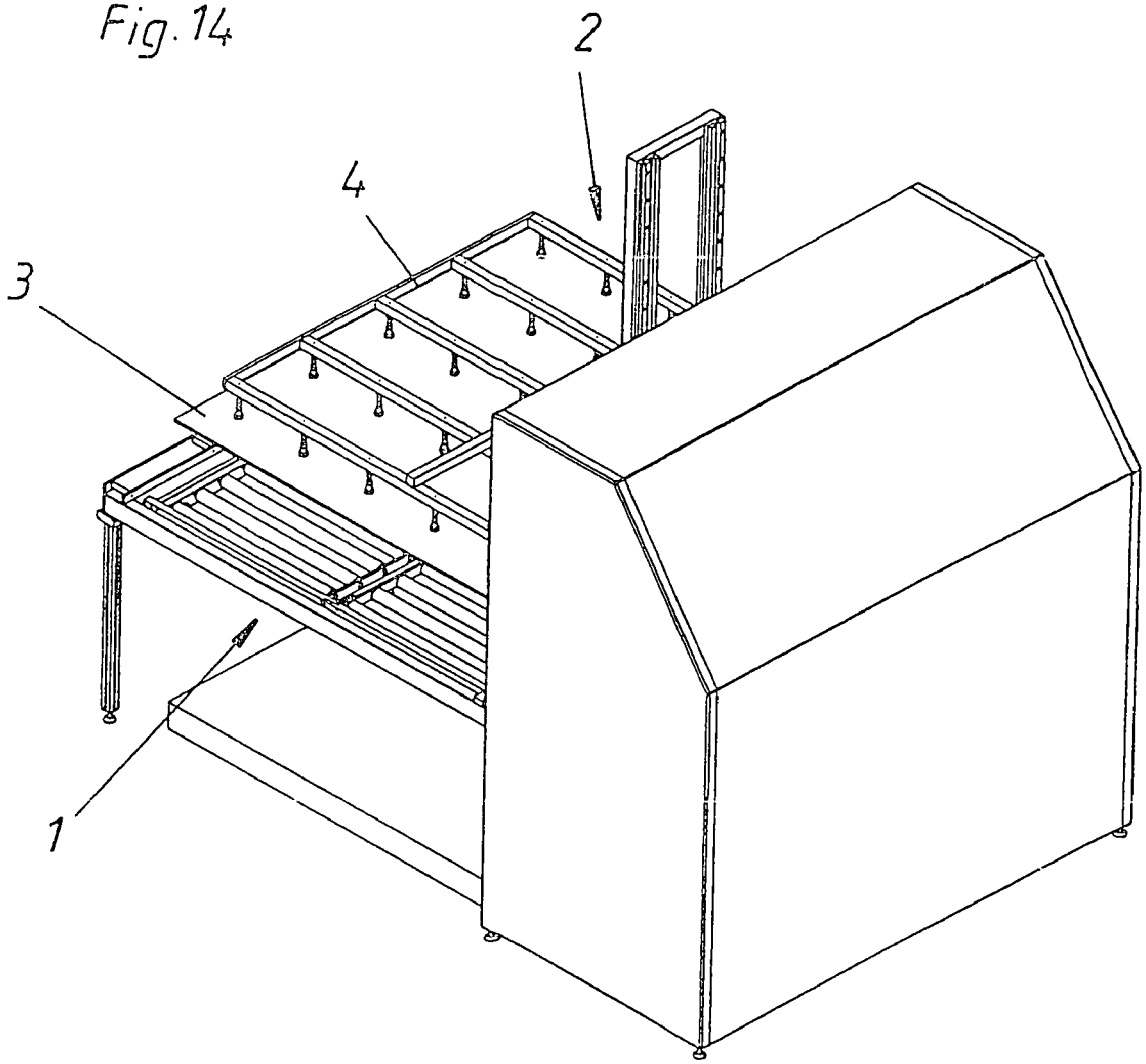
Figure 15:
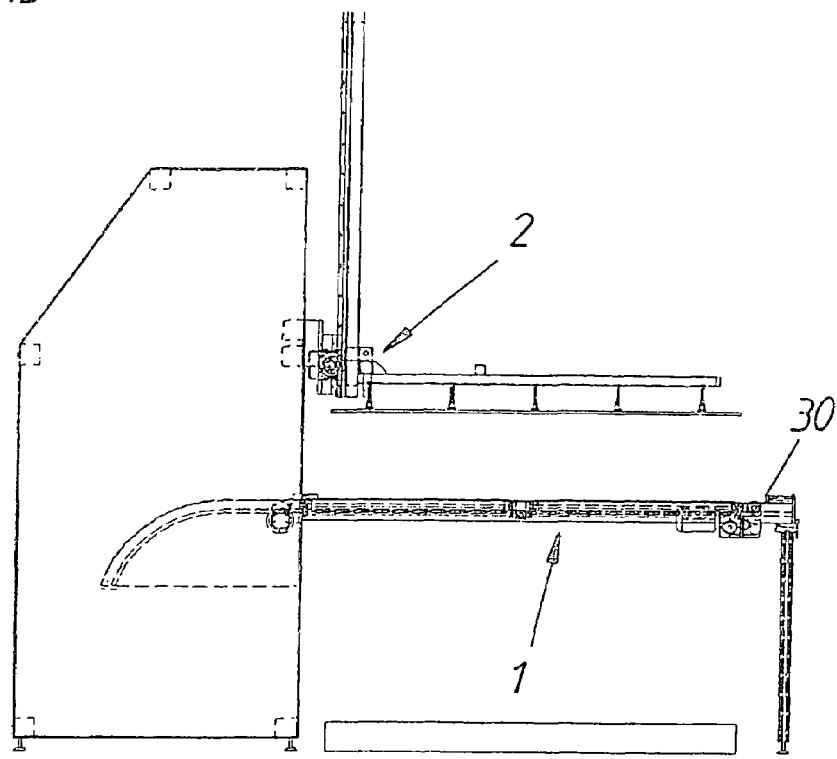
Figure 16:
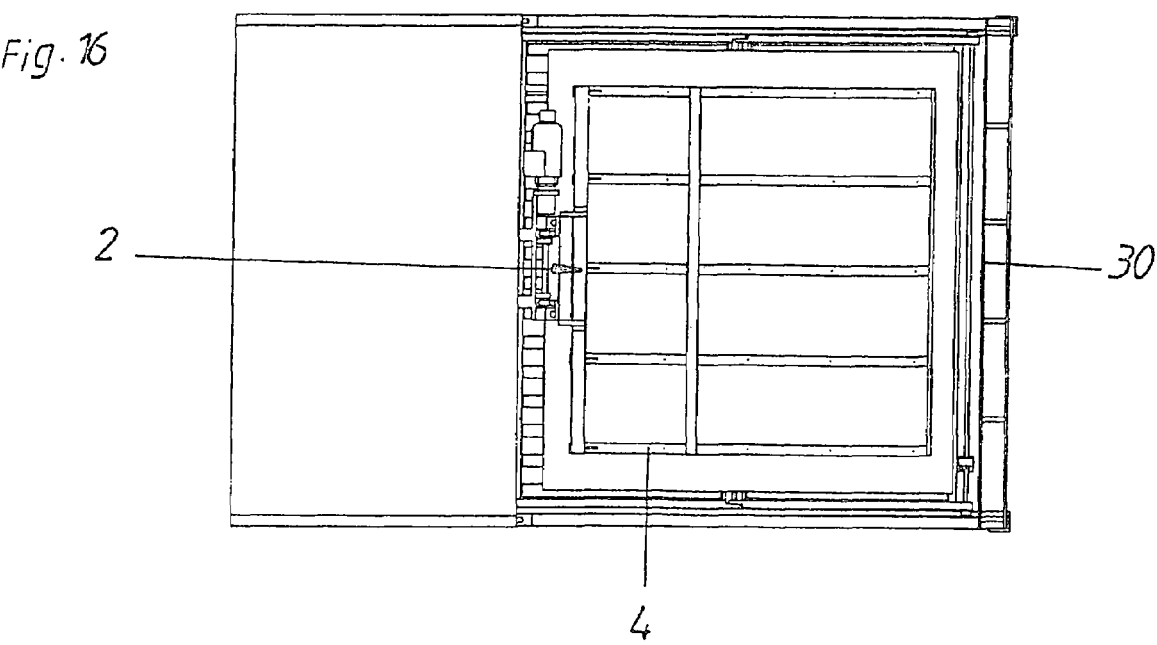
Figure 17:
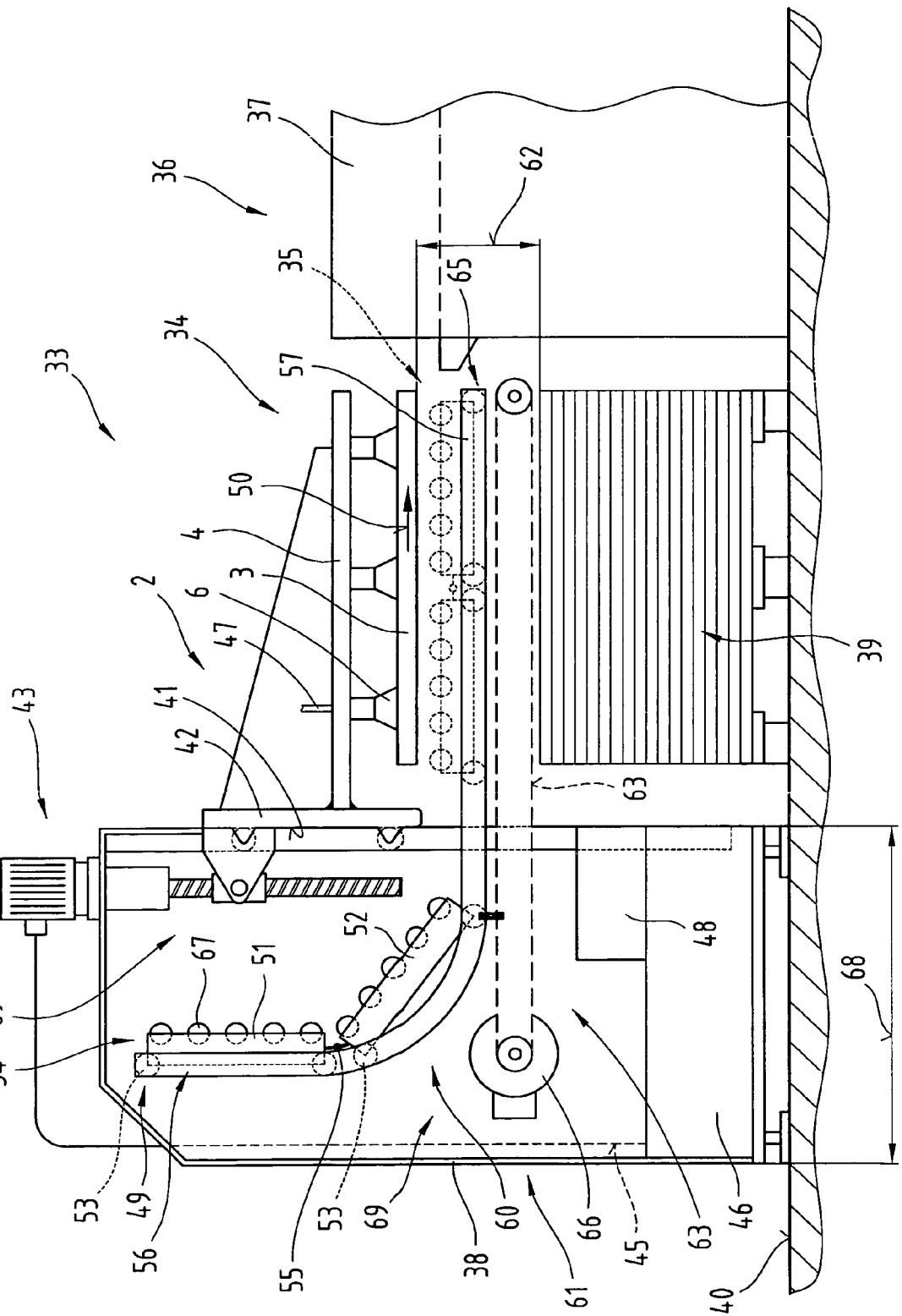
Figure 18:
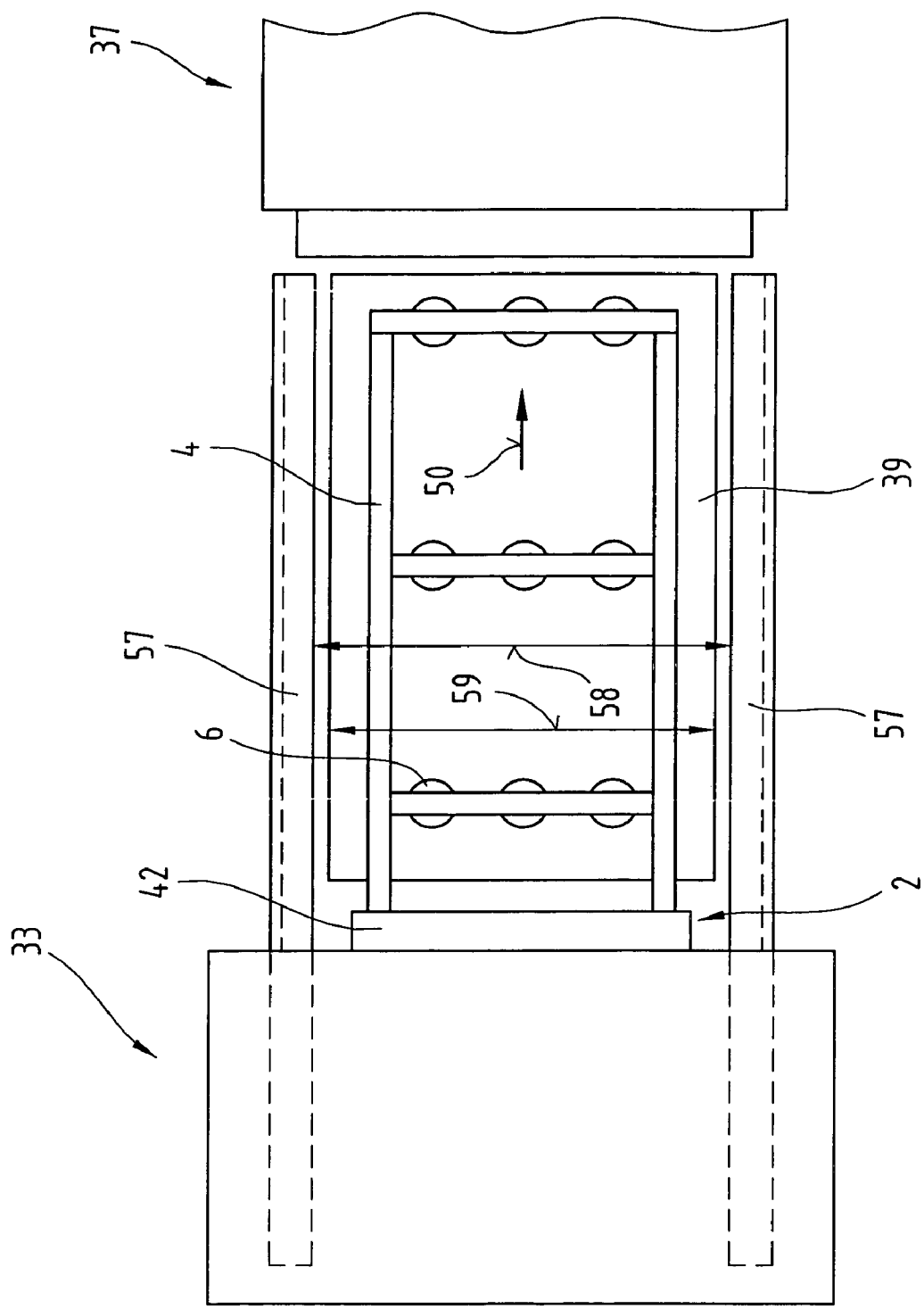
Figure 19:
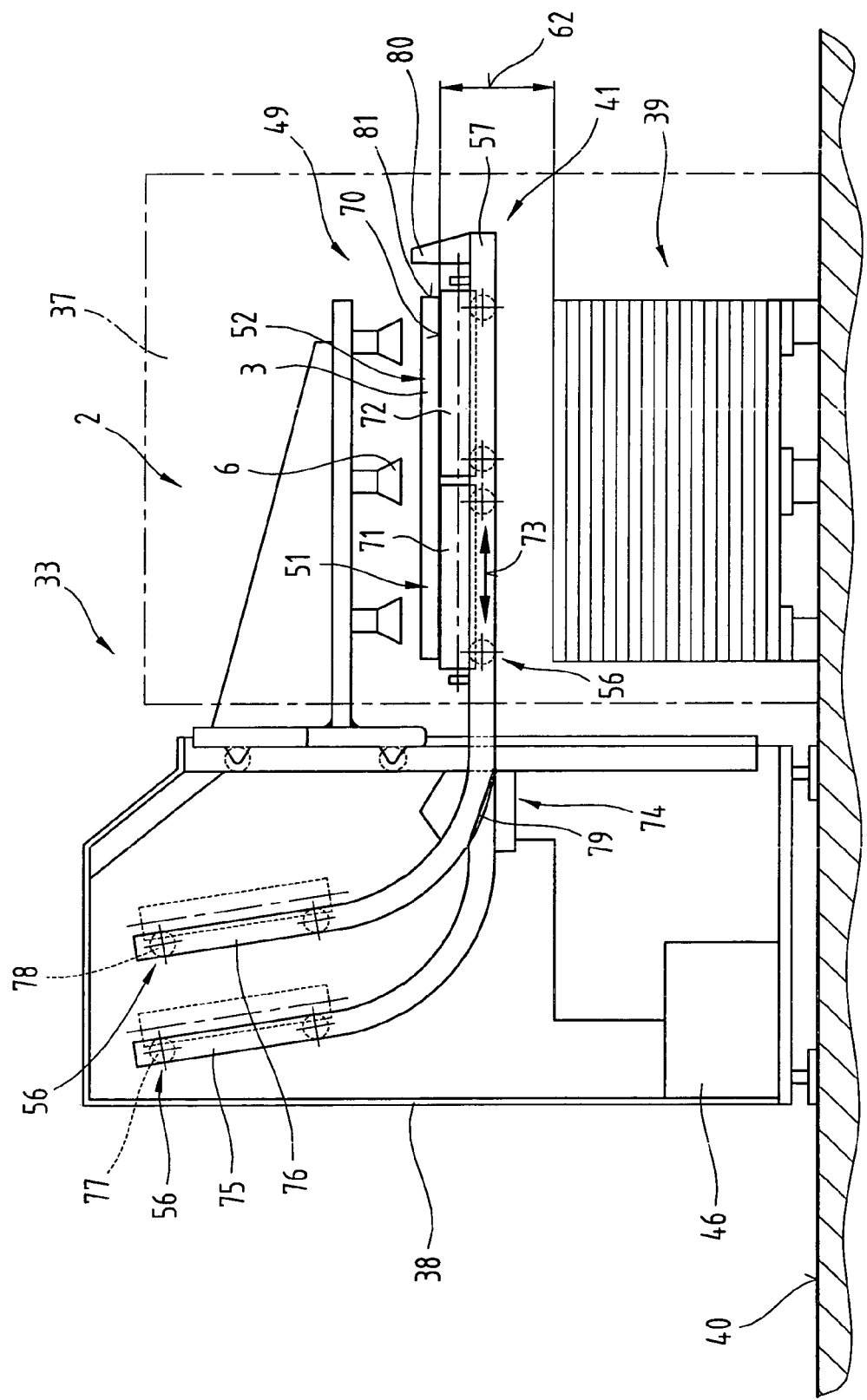

To provide a clearer understanding of the invention, it will be explained in more detail with reference to examples of embodiments illustrated in the appended drawings. Of these:

FIG. 1 is a diagram of the conveyor unit proposed by the invention in a first operating position, FIG. 2 shows cut-out A indicated in FIG. 1, FIG. 3 is a diagram of the conveyor unit proposed by the invention in a second operating position, FIG. 4 shows cut-out A indicated in FIG. 3, FIG. 5 is a diagram of the conveyor track proposed by the invention, FIG. 6 shows cut-out A indicated in FIG. 5, FIG. 7 shows cut-out B indicated in FIG. 5, FIG. 8 is a diagram of the conveyor unit proposed by the invention in a third operating position, FIG. 9 a side view of the conveyor unit, FIG. 10 is a plan view of the conveyor unit proposed by the invention, FIG. 11 is a diagram showing a part of the conveyor unit proposed by the invention in an operating position corresponding to that illustrated in FIG. 1, FIG. 12 shows cut-out A indicated in FIG. 11, FIG. 13 shows cut-out B indicated in FIG. 11, FIG. 14 is a another diagram of the conveyor unit proposed by the invention, FIG. 15 is a side view of the conveyor unit proposed by the invention, FIG. 16 a plan view of the conveyor unit proposed by the invention, FIG. 17 is a simplified diagram showing a front view of the separating and feed mechanism in partial section, FIG. 18 is a plan view of the separating and feed mechanism illustrated in FIG. 17, FIG. 19 is a simplified diagram showing a front view of another embodiment of the separating and feed mechanism in partial section, FIG. 20 is a simplified diagram showing a front view of another embodiment of the separating and feed mechanism and FIG. 21 is a simplified diagram showing a front view of another embodiment of the separating and feed mechanism in partial section.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

In FIG. 1, the conveyor track 1 is illustrated at its rear end position and the lifting mechanism in its bottom end position for picking up a sheet 3. The lifting mechanism 2 has a frame 4, the height of which can be adjusted. The frame 4 is provided with vertical tracks 5, which are mounted so as to be displaceable in the height direction in guide shoes or guide blocks 8. The frame 4 can be displaced vertically by means of a rope pulley or a gear drive, for example. In the embodiment illustrated as an example here, suction cups 6 are mounted on the frame 4, by means of which a sheet 3 can be lifted from its support 7, for example a pallet. It would also be conceivable to used mechanical means, e.g. a clamp.

The conveyor track 1 consists of two part tracks 1', which, in the embodiment illustrated as an example here, are provided in the form of roller tracks with rollers 9, although they might also be provided in the form of conveyor belts. The two part tracks 1' can be pivoted about a common shaft 10 and guided in rails 11 which have a straight portion 12 and a bent portion 13.

The part tracks 1' have pins 14, by means of which they are guided in the rails 11. The pins 14 project out from the lateral edges of the part tracks 1' oriented perpendicular to the common shaft 10 and are disposed on these lateral edges in the vicinity of the ends positioned remotely from the common shaft 10. The pins 14 may additionally be provided with rollers. One of the part tracks 1' is provided with two pinions 15 which run on rack sections 6 disposed adjacent to the rails 11 and extend across their straight portion 12. The pinions 15 are disposed concentrically with the pins 14. The pinions 15 are driven by a drive shaft 17, a belt drive 18 and a motor 19 mounted on the one part track 1'.

By means of the pinion 15 driven by the motor 19, the conveyor track 1 can be displaced between a front extended position and a rear folded position to this end, the lateral edge of the one part track 1' lying remote from the common axis 10 on which the pinions 15 are disposed is displaced in the direction of the lateral edge of the other part track 1' lying remote from the common shaft 10. As this happens, this other part track is pushed transversely to the conveying direction of the conveyor track 1 by the part-track incorporating the driven pinions 15, without the shaft 10 being lifted first. The pins 14 of the pushed part track 1' which does not have any driven pinions 15 are thus guided along the rails 11 and run through the end region of the straight portion 12 and as a result the bent portion 13 until they hit the end of the bent portion 13 at a restrictor stop 31 (FIG. 2). As the sequence continues, the common shaft 10 is lifted, thereby reducing the distance of the lateral edge of the non-driven part track 1' remote from the shaft 10. The forward extended end position in which the two part tracks lie in a common plane is illustrated in FIGS. 14 to 16 and the rear folded end position may be seen in FIGS. 1, 2 and 11. FIGS. 8 and 3 illustrate positions in between.

The rollers 9 of the two part tracks 1' are driven by a motor 20 mounted on the other part track 1'. Each roller 9 is provided with a gear 21 and the rollers 9 of the part track 1' on which the motor 20 is mounted are driven by a drive chain 22, clogged belt or similar.

The drive chain 22 also drives a drive shaft 23, which is also provided with a gear 21 which meshes with the drive chain 22. At the other end, the drive shaft 23 is provided with a bevel gear 25, which meshes with a complementary bevel gear 26. The bevel gear 26 along with another bevel gear 27 is mounted on a sleeve 28, which is pushed onto the common shaft 10, which connects the two part tracks 1' in an articulating arrangement. This other bevel gear 27 meshes with another gear 29, mounted on a drive shaft 24 for the second part track 1'.

At its end lying opposite the bevel gear 29, the drive shaft 24 is provided with a gear 21, which meshes with another drive chain 22 by means of which the rollers 9 of the second part track 1' are driven.

The folding action of the part tracks 1' is therefore not obstructed by the drive of the rollers 9.

At the start of the conveying procedure, the roller track 1 is in the rearmost folded position illustrated in FIG. 1. The frame 4 of the lifting mechanism 2 is lowered to enable the sheet 3 to be picked up by means of its suction cups 6.

The frame 4 with the sheet 3 held by suction is then moved into its upper position and the conveyor track 1 is moved into the forward, i.e. extended position, by means of the motor 19. Approximately 100 mm before the conveyor track 1 reaches its forward end position, the sheet 3 is placed on it. The roller track with the sheet 3 is then moved into the forward end position, for which purpose it can be moved with its lateral edge lying on the side of the stop (which is the lateral edge lying remote from the common shaft 10) transversely to the conveying direction underneath this stop and the sheet 3 aligned on the stop rule 30. Instead of the stop rule 30, it would also be possible to provide stop rollers. Once correctly aligned, the sheet 3 is moved horizontally by means of the rollers 9.

After the sheet 3 has left the conveyor track 1, the conveyor track 1 is moved back into its rear position and thus folded (collapsed) and the frame 4 is lowered in readiness for picking up the next sheet 3.

A "folded position" in the context of this specification means that the two part tracks do not lie in the same plane in this position, in other words subtend an opening angle of less than 180°, preferably less than 90°. However, these two part tracks need not necessarily lie one against the other in the folded end state but may still subtend an opening angle with one another, for example in the region of 30°, as is the case in the embodiment illustrated as an example in the drawings.

FIGS. 17 and 18 illustrate another embodiment of the conveyor unit, in particular a separating and feed mechanism 33 with a separating mechanism 34 for the sheets 3 and a feed mechanism 35 for feeding the sheets 3 into a production unit 36, in particular a printing machine 37.

A cabinet-type machine frame 38 is fitted with the lifting mechanism 2 comprising the frame 4 incorporating the suction cups 6 for picking up the sheet 3 from a sheet stack 39 secured to a lift carriage 42 which is displaceable in guide tracks 41 in the direction perpendicular to a support surface 40. A drive 43 of the lift carriage 42 and hence the frame 4 is provided in the form of an electrically motor-driven spindle drive 44, which is connected by means of cables 45 to a control unit 46 integrated in the machine frame 38.

The suction cups 6 are connected by pipes 47 to a pneumatic control system 48, likewise disposed in the machine frame, and are supplied by them with a vacuum pressure in order to lift the sheet 3 from the sheet stack 39. In order to convey the sheet 3 into the printing machine 37, the separating and feed mechanism 33 has a conveyor mechanism 49, comprising two roller tracks 54 fitted with conveyor means 51, 52 split transversely to a conveying direction—indicated by arrow 50—with individual drives 53, for example. The conveyor means 51, 52 are connected to one another in an articulating arrangement by means of a pivot shaft 55 extending transversely to the conveying direction—arrow 50. The conveyor means 51, 52 are guided by means of roller drives 56 in guide rails 57 projecting out from the machine frame 38 parallel with the support surface and hence in a plane parallel with the support surface 40. A distance 58 between the guide rails 57 extending parallel with the support surface 40 is bigger than a width 59 of the sheet 3.

The guide rails 57 run in the machine frame 38 across 90° curved pieces 60 essentially perpendicular to the support surface 40 and in the direction opposite the support surface 40.

A displacement drive 61 for displacing the conveyor means 51, 52 between a non-operating position inside the machine frame 38, in which the conveyor means 51, 52 are outside of a lifting range 62 of the sheet 3—as indicated by solid lines—into an operating position between the raised sheet 3 and the sheet stack 39—as indicated by broken lines—e.g. by means of a chain drive 62 with a circulating drive chain 63, the chain strand of which is guided parallel with guide rails 57 projecting out from the machine frame 38. The roller drive 56, which is moved into an end position 65 when the conveyor means 51, 52 are moved into the operating position, is drivingly linked to a drive strand 64 of the drive chain 63.

A drive motor 66 of the drive system 61 can be controlled so that its direction of rotation can be reversed, thereby permitting the requisite change in the displacement direction in order to move the conveyor means 51, 52 between the non-operating position and the operating position.

In the embodiment illustrated as an example, broken lines show the operating position of the conveyor means 51, 52, in which they are moved by the conveyor rollers 67 between the raised sheet 3 and the sheet stack 39 in readiness for picking up the sheet 3 and conveying it into the printing machine 37. The sheet 3 is set down by means of the lifting mechanism 2 on the conveyor means 51, 52 and conveyed by the latter to the printing machine 37. In order to pick up another sheet 3 from the sheet stack 39, the conveyor means 51, 52 are moved by means of the chain drive 62 into the non-operating position within the machine frame indicated by solid lines, for which purpose a deflection takes place in the guide rails 57 from the position parallel with the support surface 40 into a position more or less perpendicular thereto, which makes for a very space-saving design for the separating and feed mechanism 33 due to a low depth 68 for the machine frame 38.

It should also be pointed out that, instead of conveyor means 51, 52 in the form of roller tracks 54, it would naturally also be possible to use split belt conveyors disposed one after the other in the conveying direction—arrow 50—and connected to one another by means of the pivot shaft 55.

It should also be pointed out that the displacement drive 61 for displacing the conveyor means 51, 52 may naturally also be provided as a linear drive 69 in the form of the spindle drive 44 described in connection with the lifting mechanism 2. Conversely, it would naturally also be possible for the drive 43 for the lifting mechanism 2 to be provided in the form of a chain drive 62, described as a means of displacing the conveyor means 51, 52, or another linear drive e.g. a hydraulic cylinder, pneumatic cylinder operated by a pressurising medium.

FIG. 19 illustrates another embodiment of the mechanism 33 for separating and feeding the sheet 3 from the sheet stack 39. The lifting mechanism 2 used will not be described in detail again as these details correspond to the embodiments described as examples above.

A detailed description will be given of another possible design of the feed mechanism 35 for feeding the printing machine 37 with the sheet 3.

Projecting out from the machine frame 38 forming a conveyor plane 70 of the conveyor means 51, 52, for example belt conveyors 71, 72, parallel with the support surface 40 in the operating position are guide rails 57. The conveyor means 51, 52 are mounted so as to be displaceable in the latter by means of roller drives 56. In the embodiment illustrated as an example here, the conveying direction for the sheet 3 extends in the direction perpendicular to the displacement direction of the conveyor means 51, 52 in the guide tracks—indicated by double arrow 73.

In the machine frame 38, the guide rails 57 branch via a control switch 74 into two mutually parallel track portions 75, 76 for respectively accommodating one of the conveyor means 51, 52 in the non-operating position indicated by broken lines, in which they are parked inside the machine frame 38 outside the lifting range 62.

After the sheet 3 has been lifted off the sheet stack 39, the conveyor means 51, 52 are moved by means of at least one respective drive 77, 78 co-operating with the roller drives 56 in a consecutive sequence into the operating position between the raised sheet 3 and the sheet stack 39. As a result, the sheet is lowered by the lifting mechanism 2 onto the belt conveyors 71, 72, released by the suction cups 6 and, once the belt conveyors 71, 72 are started, fed to the printing machine 37.

In order to pick up another one of the sheets 3 from the sheet stack 39, the belt conveyors 71, 72 are now moved in consecutive sequence into the non-operating position within the machine frame 38, for which purpose the control switch 74, incorporating a switch tongue 79, which can be displaced by an electric motor and activated by the control unit 46, feeds each of the conveyor means 51, 52 to the appropriate track portion 75, 76.

Another detail may be seen in FIG. 19, where a stop means 80 disposed in the end region of the horizontally extending guide rails 57, the purpose of which is to align the sheet 3 with a longitudinal edge 81 exactly parallel with the conveying direction. To this end, before depositing the sheet 3 on the belt conveyors 71, 72, the conveyor means 51, 52, are halted in an intermediate position at a short distance before the stop means 80. Once the sheet 3 has been deposited on the belt conveyors 71, 72, an additional movement is effected in the direction of the stop means 80 by briefly operating the drives 77, 78 until the longitudinal edge 81 makes contact with the stop means 80 and the sheet 3 is thus aligned before being fed to the printing machine 37.

FIG. 20 illustrates another embodiment of a separating and feed mechanism 33. In this embodiment, two cabinet-type housings 83, 84 are disposed at a distance 82 apart from one another, between which a space 85 is provided for the sheet stack 39. The housings 83, 84 are positioned relative to one another and are connected by means of a cover frame 86, for example, which is also used to mount the lifting mechanism 2, e.g. a pneumatic cylinder 87 with a piston rod 88 which is displaced perpendicular to the support surface 40. Secured to the piston rod 88 is the frame 4 incorporating the suction cups 6 for lifting the sheet 3 off the sheet stack 39.

In the embodiment illustrated as an example here, the conveyor means 51, 52 are belt conveyors 71, 72 which can be displaced in the guide rails 57, as described above in connection with the other drawings, between the non-operating position outside of the lifting range 62 of the sheet 3 and the operating position for depositing the sheet 3 on the belt conveyors 71, 72 and conveying them.

Accordingly, the belt conveyors 71, 72 are displaced in the direction extending transversely to the conveying direction of the sheet 3, a separate guide system 89 formed by the guide rails 57 being provided in each of the oppositely lying houses 83, 84.

The guide rails 57 extend into the housings 83, 84 at an angle to the support surface 40, thereby enabling a space-saving layout. Across the curved pieces 60, a transition is obtained parallel with the support surface 40 in a guide region 90 of the guide rails 57 in which the latter project towards one another in the direction of a mid-plane 91. As already explained with reference to FIG. 18, the guide rails 57 are naturally also disposed outside of the lifting range 62 for the sheet 3, i.e. disposed relative to one another in the distance 82 that is bigger than the width 59 of the sheet stack 39, which is of relevance when it comes to conveying the sheet 3 transversely. Naturally, however, if the distance 82 between the housings 83, 84 were made bigger, it would also be possible to opt for a design in which the sheet 3 can be conveyed in the lengthwise direction.

As may also be seen from the diagram given in FIG. 20, the path of the guide rails 57—indicated by broken lines—inside the housings may be inclined both in the direction towards the support surface 40 and in the direction towards the cover frame 86.

FIG. 21 illustrates another embodiment of the separating and feed mechanism 33, which offers a different solution in terms of the design and layout of the conveyor means 51, 52 from that described above. The layout of the housings 83, 84 and the lifting mechanism 2 need not be described again.

The conveyor mechanism 49 for the sheet 3 in this instance comprises, for example, four belt conveyors 92 extending in respective mutually parallel pairs which can be displaced transversely to the conveying direction into the housings 83, 84 disposed on either side of the space 85 for the sheet stack 39 in order to free up the lifting range 62 for the sheet 3.

Two of the respective belt conveyors 92 are pivotably connected to one another by means of a pivot shaft 93 disposed between them in the conveying direction and can be displaced by means of the guide mechanism 89 comprising the guide rails 57 between the operating position and the non-operating position, the guide rails 57 extending in a plane parallel with the support surface 40.

By connecting two of the respective belt conveyors 92 by means of pivot shafts 93, a space-saving configuration of the equipment is achieved because in the non-operating position in which the belt conveyors 92 are disposed and displaced inside the housings 83, 84 on either side of the space 85, a folding action takes place as schematically illustrated by broken lines. This embodiment also makes for a guide mechanism 89 and guide rails 57 of a very simple structure.

Various modifications of the embodiment illustrated as an example are conceivable and possible without departing from the scope of the invention. For example, it would be conceivable and possible for the conveyor track as a whole to fold open or down about a shaft disposed to the side of the transport path for the lifting mechanism and oriented in the conveying direction. However, a design consisting of two part tracks which fold together is preferred, as is the case with the embodiment illustrated as an example.

For the sake of good order, finally, it should be pointed out that in order to provide a clearer understanding of the construction of the conveyor unit proposed by the invention, it and its constituent parts are illustrated to a certain extent out of scale and/or on an enlarged scale and/or on a reduced scale.

The underlying objectives of the individual solutions proposed by the invention may be found in the description.

Above all, the individual embodiments of the subject matter of the invention illustrated in FIGS. 1 to 21 may be construed as independent solutions proposed by the invention. The associated objectives and solutions proposed by the invention may be found in the detailed descriptions of these drawings.

LIST OF REFERENCE NUMBERS

1 Conveyor track 36 Production unit
1' Part track 37 Printing machine
2 Lifting mechanism 38 Machine frame
3 Plate 39 Plate stack
4 Frame 40 Support surface
5 Rail
6 Suction cup 41 Guide track
7 Support 42 Lift carriage
8 Guide block 43 Drive
9 Roller 44 Spindle drive
10 Shaft 45 Cable
11 Rail 46 Control unit
12 Portion 47 Pipe line
13 Portion 48 Pneumatic control unit
14 Pin 49 Conveyor mechanism
15 Pinion 50 Arrow
16 Rack section 51 Conveyor means
17 Drive shaft 52 Conveyor means
18 Belt drive 53 Single drive
19 Motor 54 Roller tracks
20 Motor 55 Pivot shaft
21 Gear 56 Roller drive
22 Drive chain 57 Guide rail
23 Drive shaft 58 Distance
24 Drive shaft 59 Width
25 bevel gear 60 Curved piece
26 Bevel gear 61 Displacement drive
27 Bevel gear 62 Lifting range
28 Sleeve 63 Chain drive 29 Bevel gear
30 Stop rule
31 Stop
32
33 Separating and feed mechanism
34 Separating mechanism
35 Feed mechanism
64 Drive strand
65 End position
66 Drive motor
67 Conveyor roller
68 Depth
69 Linear drive
70 Conveyor plane
71 Belt conveyor
72 Belt conveyor
73 Double arrow
74 Control switch
75 Rail portion
76 Rail portion
77 Displacement drive
78 Displacement drive
79 Switch tongue
80 Stop means
81 Longitudinal edge
82 Distance
83 Housing
84 Housing
85 Space
86 Cover frame
87 Pneumatic cylinder
88 Piston rod
89 Guide system
90 Guide region
91 Mid-plane
92 Belt conveyor
93 Pivot shaft

The invention claimed is:

1. Conveyor unit for a printing machine comprising:
a lifting mechanism for separating a sheet from a sheet stack and transporting the separated sheet along a vertical transport path; and
a conveyor track with conveyor means for transporting the separated sheet in a conveying direction transverse to the transport path, wherein the conveyor track includes first and second interconnected track parts, and wherein the first and second track parts are moveable to (i) a first position where the first and second track parts lie in a same plane and are in the transport path, and (ii) a second position where the first and second track parts do not lie in a same plane and are adjacent to the transport path, wherein the first and second parts are pivotable about a common shaft, and
wherein the first and second track parts are moveable in order to fold the conveyor track, by lifting the common shaft in a direction toward a lateral edge of the second track part positioned remotely from the first track part.

2. Conveyor unit as claimed in claim 1, wherein the common shaft is oriented in the conveying direction.

3. Conveyor unit as claimed in claim 1, wherein the first and second track parts are movable transversely to the conveying direction.

4. Conveyor unit as claimed in claim 1, wherein the first and second track parts are guided by means of rollers or pins in respective first and second guide tracks having a straight portion and a bent portion.

5. Conveyor unit as claimed in claim 4, wherein at least one of the first and second track parts includes a rack section with which a driven rack mounted on one of the first and second guide tracks meshes.

6. Conveyor unit as claimed in claim 5, wherein the rack section extends along the straight portion of the track parts.

7. Conveyor unit as claimed in claim 1, wherein the conveyor means or the first and second track parts include at least one of rollers or conveyor belts.

8. Conveyor unit as claimed in claim 1, wherein a stop is provided for the separated sheet in a lateral region of the conveyor track, oriented transversely to the conveying direction.

9. Conveyor unit as claimed in claim 8, wherein the stop includes a stop rule.

10. Conveyor unit as claimed in claim 8, wherein the first and second track parts are displaceable by respective lateral edges tying on a side of the stop underneath the stop transversely to the conveying direction.

11. Conveyor unit as claimed in claim 1, wherein at least a first motor is mounted on the conveyor track for driving the conveyor means of the conveyor track and at least a second motor is mounted on the conveyor track for moving the first and second track parts.

12. Conveyor unit as claimed in claim 11, wherein the first motor for driving the conveyor means is mounted on the first track part and further comprising a centre shaft for transmitting a driving action to the conveyor means of the second track part and lying in the common shaft.

13. Conveyor unit as claimed in claim 12, wherein the first track part includes rollers for driving by two drive shafts mounted respectively on the first and second track parts and by the centre shaft.

14. Conveyor unit as claimed in claim 13, wherein the two drive shafts include respective bevel gears mutually meshing with bevel gears of the centre shaft.

15. Conveyor unit as claimed in claim 1, wherein the lifting mechanism has a frame which can be raised and lowered, on which retaining means for retaining the separated sheet is mounted.

16. Conveyor unit as claimed in claim 15, wherein the retaining means includes suction cups.

17. Conveyor unit comprising:
a separating and feed mechanism for a printing machine including a means for separating a sheet from a stack of sheets and lifting the separated sheet along a vertical transport path; and
a conveyor means including first and second moveable track portions for conveying in a conveying direction in a conveying plane the separated sheet, wherein the conveying direction is transverse to the transport path, wherein the first and second track portions are moveable (i) to overlap the transport path and (ii) to be positioned substantially parallel to each other and adjacent to the transport path, wherein the first and second track portions are pivotably connected to each other by a pivot shaft, wherein the first and second track portions are moveable in respective first and second guide rails extending parallel with the conveying direction and running in planes extending perpendicular to or parallel with the conveying direction.

18. Conveyor unit as claimed in claim 17, wherein the two track portions extend parallel in the conveying direction.

19. Conveyor unit as claimed in claim 18, wherein the two track portions include at least one belt conveyor or band conveyor.

20. Conveyor unit as claimed in claim 18, wherein each of the track portions includes a displacement drive.

21. Conveyor unit as claimed in claim 17, wherein the conveyor means includes a conveyor plane for the separated sheet moveable into a position substantially perpendicular to a support surface on which the sheet stack is supported.

22. Conveyor unit as claimed in claim 17, wherein the guide rails run in a straight line.

23. Conveyor unit as claimed in claim 17, wherein the guide rails extend in a curved arrangement.

24. Conveyor unit as claimed in it claim 17, wherein the guide rails extend in an arcuate shape.

25. Conveyor unit as claimed in claim 17, wherein the guide rails are of a branching-type design.

26. Conveyor unit as claimed in claim 17, wherein the first and second track portions are mounted for movement in the first and second guide rails, respectively, by means of roller drives.

27. Conveyor unit as claimed in claim 26, wherein the first and second track portions are drivingly connected to a displacement drive to effect a movement between an operating position where the first and second track portions overlap the transport path and a non-operating position where the first and second track portions are substantially parallel to each other and adjacent to the transport path.

28. Conveyor unit as claimed in claim 27, wherein the displacement drive includes a chain drive.

29. Conveyor unit as claimed in claim 17, wherein the first and second track portions are split in the direction extending perpendicular to the conveying direction.

30. Conveyor wilt as claimed in claim 17, wherein the first and second track portions are split in the direction extending parallel with the conveying direction.

31. Conveyor unit as claimed in claim 17, wherein the first and second track portions are pivotably connected to each other in a dividing plane by a pivot system forming the pivot shaft.

32. Conveyor unit as claimed in claim 17, wherein at least one of the first and second track portions co-operates with a stop including a restrictor stop for a longitudinal edge of the separated sheet in a direction extending parallel with the conveying direction.

33. Conveyor unit as claimed in claim 32, wherein the stop includes a stop rail.

34. Conveyor unit as claimed in claim 32, wherein at least one positioning device for orienting the separated sheet on the stop means is disposed on a frame of at least one of the separating and feed mechanism or the conveyor means.

35. Conveyor unit as claimed in claim 34, wherein the positioning device includes at least one driven conveyor cylinder or conveyor roller.

36. The conveyor unit of claim 17, wherein the first and second track portions are moveable in a direction other than the conveying direction to be positioned adjacent to the transport path.

* * * * *

UNITED STATES PATENT AND TRADEMARK OFFICE
CERTIFICATE OF CORRECTION

| | | |
|---|---|---|
| PATENT NO. | : 7,744,337 B2 | Page 1 of 1 |
| APPLICATION NO. | : 10/543531 | |
| DATED | : June 29, 2010 | |
| INVENTOR(S) | : Hubert Anton Kaufmann and Peter Weingartner | |

It is certified that error appears in the above-identified patent and that said Letters Patent is hereby corrected as shown below:

Claim 10 Column 10, Line 12, "tying" should read --lying--.
Claim 24 Column 11, Line 6, delete "it".
Claim 30 Column 12, Line 1, "wilt" should read --unit--.

Signed and Sealed this

Twenty-eighth Day of June, 2011

David J. Kappos
*Director of the United States Patent and Trademark Office*